United States Patent [19]

Masson et al.

[11] 3,842,883

[45] Oct. 22, 1974

[54] RADIAL-PLY TIRES

[75] Inventors: Yves Masson, Paris; Henri Greiner, Conflans-Ste-Honorine, both of France

[73] Assignee: Pneumatiques Caoutchouc Manufacture et Plastiques Kleber-Colombes, Paris, France

[22] Filed: Aug. 16, 1973

[21] Appl. No.: 388,773

Related U.S. Application Data

[63] Continuation-in-part of Ser. No. 163,347, Aug. 16, 1971, abandoned.

[30] Foreign Application Priority Data

July 24, 1970 France .............................. 70.27542

[52] U.S. Cl. ............. 152/354, 152/357, 152/362 R, 152/374
[51] Int. Cl. ............................................. B60c 9/02
[58] Field of Search .......... 152/352, 353, 354, 357, 152/359, 362 R, 374, 355

[56] References Cited
UNITED STATES PATENTS

| | | | |
|---|---|---|---|
| 3,192,984 | 7/1965 | Bourdon ............................ | 152/354 |
| 3,207,200 | 9/1965 | Boussu et al. ...................... | 152/354 |
| 3,232,331 | 2/1966 | Cappa et al. ...................... | 152/354 |
| 3,253,635 | 5/1966 | Travers .............................. | 152/354 |
| 3,285,314 | 11/1966 | Roberts .............................. | 152/353 |

*Primary Examiner*—Drayton E. Hoffman
*Attorney, Agent, or Firm*—Brisebois & Kruger

[57] ABSTRACT

This invention relates to radial-ply tires having a reinforcing belt located below the tread.

With a view to improving the lateral stability and resistance at high speed a rubber strip of high modulus of elasticity is applied to the sides of the carcass over part only of the radial dimension or height of the tire so that said rubber strip adheres to the carcass, said strip being made from a rubbery mixture having a high modulus of elasticity, not less than 40kg/cm$^2$ at 100 percent elongation and which incorporates at least 40 parts of carbon black and at least 35 parts of a fine polyolefine powder such as polyethylene, having a molecular weight greater than 500,000. The rubber strip extends from the bead to beyond the middle height of the section of the tire over at least 2/3 of the height of the side, and the remaining part of the side of the carcass between the upper edge of the said strip and the edge of the belt is coated with rubbery mixture having a lower modulus of elasticity in order to form a supple bending zone.

4 Claims, 1 Drawing Figure

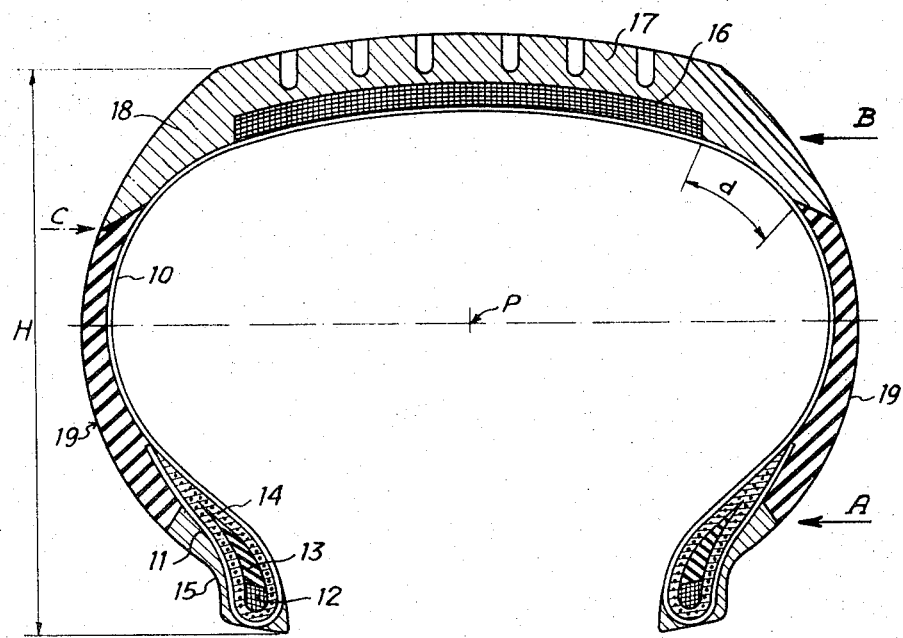

RADIAL-PLY TIRES

FIELD OF THE INVENTION

The present invention relates to radial-ply tires having a reinforcing belt located below the tread, and is a continuation-in-Part Application from Application S.N. 163,347 filed July 16th, 1971, now abandoned.

PRIOR ART

It is known that tires of this kind have a certain number of advantages, such as, in particular, good wear and creep resistance, and good road-holding and road-grip.

It is also known that the efficiency of this type of tire can be increased, more particularly for travelling at high speed, by decreasing the suppleness of the side walls, i.e., those parts of the wall between the wheel rim and the tread edges of the tire. With this end in view, various means have already been proposed to increase the transverse rigidity of the side walls and consisting, for example, in stiffening the lower half of said side walls between the bead and the plane of greatest width of the tire with reinforcements made from biassed fabric separate from the actual carcass and forming, according to their arrangement in the tire, "flippers," reinforcing strips or special stabilising layers.

It has also been proposed to insert in the side walls of a tire, profiled portions or reinforcements made from rubber of varying hardnesses positioned at various points on the side walls in such a manner as to reserve more flexible zones in the other parts thereof. Functionally, these various solutions improve the lateral stability of the tire and thus are more or less satisfactory in this respect. However, they all have the drawback of complicating the manufacture by increasing the number of separate elements which have to be assembled during building, whereby both the cost of the tire and the risks of defects therein are increased.

SUMMARY OF INVENTION

The invention consists in a pneumatic tire casing comprising two beaded edge portions incorporating reinforcing bead wires, a radial-ply carcass extending between said bead portions and having its edges turned up around said bead wires, a tread portion including a central part and lateral parts applied to the outer part of the side of said carcass, a reinforcing belt located between said tread portion and said carcass and having a width approximately equal to the width of the central part of said tread portion, said lateral parts extending beyond the side edges of said reinforcing belt, said central tread portion and said reinforcing belt being disposed one above the other, and two stiffening side wall strips each applied to the outer face of one side of said carcass and extending radially from a point adjacent the bead up edge of said carcass to a point beyond the centre of the height of the tire section and over at least 2/3 of the height of said section, said side wall strips being made from a rubbery mixture having a modulus of elasticity not less than 40 kg/cm$^2$ at 100 percent elongation and which incorporates at least 40 parts of carbon black per 100 parts of rubber, and at least 35 parts per 100 parts of rubber of a fine polyolefine powder having a molecular weight greater than 500,000.

It is an object of the invention to provide a tire having a better directional stability and shorter response times to transverse movements and stresses, in a more simple, more certain and less costly manner than hitherto.

Other objects and advantages will become apparent from a reading of the following description of the invention together with the claims and the accompanying drawings.

DESCRIPTION OF THE DRAWING

The single FIGURE of the drawing shows a cross-section through a presently prepared embodiment of the invented radial-ply tire.

DESCRIPTION

Referring now to the drawing, the tire shown comprises a radial carcass 10 formed by one or more plies of "cord" fabric without a weft or having a slight weft, formed by by rayon, nylon, polyester or metal cords, these cords being oriented along the meridian planes of the tire. These carcass plies 10 extend in continuous manner from one bead to the other.

The edges 11 of these carcass plies 10 are turned up about bead wires 12 and they more or less envelop the assembly formed by the filler strip 13 and the flipper 14. These turned up edges 11 of the carcass are partially covered by the rim strips 15 made from an abrasion-resistant rubbery mixture in order to withstand the rubbing of these parts of the tire against the edges of the rim.

The apex of the carcass 10 is hooped by a reinforcing belt 16 which is relatively rigid and inextensible and formed, for example, by two or more pairs of textile or metal "cord" fabric layers, the cords of which form small angles, of the order of 20°, with respect to the equatorial plane of the tire. The belt 16 is surmounted by a rubber tread 17 having an anti-skid tread pattern suitable for the envisaged use of the tire. The modulus of elasticity of the tread is of the order of 25 kg/cm$^2$ at 100 percent elongation. The width of the belt 16 is approximately equal to the width of the tread surface and the bevelled lateral parts 18 of the tread 17 extend beyond the edges of the belt and are applied to the carcass 10 at the point of the shoulders of the tire on both sides of the belt 16. Side wall strips 19 extend between the rim strips 15 of the beads and the bevelled edges 18 of the tread, at least the lower edges of which are joined progressively in bevelled manner to the rim stip 15 and to the outer side edges of the lateral parts 18 of the tread. The essential function of these side wall strips 19 was up to now to protect the external surface of the carcass 10 and these strips are made of a relatively supple rubbery mixture, i.e., having a Shore A hardness of approximately 60 and a lower modulus of elasticity, of the order of 15 kg/cm$^2$ at 100 percent elongation.

In order to clarify the description, the parts of the carcass 10 between the upper level A of the rim strips 15 of the beads and the lower level B of the side edges of the belt 16 will be referred to hereinafter by the phrase "sides of the carcass."

According to the invention, the two side wall strips 19 of the tire are made entirely from a rubbery mixture having a very high modulus of elasticity, i.e., at least equal to 40 kg/cm$^2$ at 100 percent elongation, such that the side walls of the tire have a great transverse rigidity which imparts better directional stability to the tire and shorter-response times to transverse movements and stresses. This result is obtained in a very simple manner without it being necessary to use special reinforcing elements to the tire adding to the usual elements and in a manner to render the manufacture more complicated, more delicate and more burdensome. In fact, a tire according to the invention comprises, from a building point of view, the same elements as a standard tire so that its building does not necessitate any supplementary operation or elements and does not require any particular care on the part of the manufacturer.

Moreover, it has been proved in surprising manner that such a tire according to the invention offers a remarkably high resistance to high speed tests. In fact, while the standard tires having ordinary side wall strips made from flexible rubber perish rapidly during high speed tests due to loosening and tearing of the tread and belt arising from the edges of the belt, tires according to the invention having side wall strips 19 made from rubber having a high modulus of elasticity resist for 4 to 10 times longer at high speed than ordinary tires. It may be imagined that the reason for this exceptional resistance of the tires according to the invention to the wearing of the belt and of the tread, which are, moreover, of simple and conventional construction, resides in the fact that the side wall strips 19 made from rubber having a high modulus unite the total transverse rigidity of the sides with the total transverse rigidity of the tread 17 reinforced by the belt 16 so that the energy dissipated in the region of the shoulders of the tire is smaller, which is less prejudicial to the bond between the edges of the belt 16, and either the carcass 10, or the sides 18 of the tread. Whatever it may be, this improvement in the behaviour of the tires during high speed tests is obtained without having to add thereto particular reinforcing elements in this part of the tire and thus without complicating the construction. However, in this respect, it seems important in order to obtain this result that the lateral parts 18 of the tread 17 extend on both sides of the belt 16 in the zone of the shoulders of the tire along a distance $d$ of at least 1.5 cm approximately, to form supple bending zone between the top of the tire and the side wall, the zone being formed substantially with the rubbery mixture of the tread 17 which normally has a lower modulus of elasticity than the side wall strips 19 i.e., not greater than 25 kg/cm$^2$ at 100 percent elongation, while the side wall strips 19 extend to a height C at least at 2/3 of the radial dimension or height H of the tire between the bottom of the beads and the lateral parts of the tread and in such a manner to raise it beyond the plane P of greatest width of the tire.

For the manufacture of the high modulus side wall strips 19, compositions of rubbery mixtures are used filled both with large amounts of at least 40 parts of carbon black per 100 parts of rubber, and with at least 35 parts per hundred parts of making a fine powder of a polyolefine such as polyethylene having a very high molecular weight equal to or greater than 500.000. The table below shows two examples of mixtures which may be suitable.

| | A | B |
|---|---|---|
| Smoked sheet or SBR 1500 | 100 | 100 |
| Reinforcing carbon black | 40 | 60 |
| Polyethylene | 35 | 50 |
| Zinc oxide | 5 | 5 |
| Stearic acid | 1 | 1 |
| Aromatic oil | 5 | 5 |

-Continued

| | A | B |
|---|---|---|
| Antioxydising agents | 2 | 2 |
| MOR accelerator | 1.5 | 1.5 |
| Sulphur | 1.75 | 1.75 |
| Shore A hardness | 73 | 84 |
| Moduli of elasticity 100% (kg/cm$^2$) | 55 | 80 |

These mixtures are prepared and then extruded in the form of side wall strips 19 which are used during building of the tires. The latter are vulcanised normally at approximately 150°C. These tires submitted to high speed resistance tests have shown that they can resist for a much longer time than standard tires. In tests on the road, they show a better transverse stability.

Naturally, the invention is not limited to the specific embodiments described above, from which other modifications could be conceived. Thus, for example, the side wall strips 19 having a high modulus could possibly be coated with a thin protective film, for example, made from a rubbery mixture having a lower modulus in order to improve the resistance to cracks, if the conditions of use or climatic conditions necessitate such a protection.

We claim:

1. A pneumatic tire casing comprising two beaded edge portions incorporating reinforcing bead wires, a radial-ply carcass extending between said bead portions and having its edges turned up around said bead wires, a tread portion including a central part and lateral parts applied to the outer part of the side of said carcass, a reinforcing belt located between said tread portion and said carcass and having a width approximately equal to the width of the central part of said tread portion, said lateral parts extending beyond the side edges of said reinforcing belt, said central tread portion and said reinforcing belt being disposed one above the other, and two stiffening side wall strips each applied to the outer face of one side of said carcass and extending radially from a point adjacent the bead edge of said carcass to a point beyond the centre of the height of the tire section and over at least 2/3 of the height of said section, said side wall strips being made from a rubbery mixture having a modulus of elasticity not less than 40 kg/cm$^2$ at 100 percent elongation and which incorporates at least 40 parts of carbon black per 100 parts of rubber, and at least 35 parts per 100 parts of rubber, of a fine polyolefine powder having a molecular weight greater than 500,000.

2. A pneumatic tire casing, according to claim 1, wherein at least said lateral parts of said tread portion are made from a rubbery material having a modulus of elasticity not greater than 25 kg/cm$^2$ at 100 percent elongation so that said lateral parts of said tread portion form a limited supple flexion zone on each side of said reinforcing belt.

3. A pneumatic tire casing according to claim 2, wherein said lateral parts extend beyond said side edges of said reinforcing belt for a distance of at least 1.5 cm.

4. A pneumatic tire casing according to claim 1, wherein said polyolefine is polyethylene.

* * * * *